US008950550B2

(12) United States Patent
Maurice et al.

(10) Patent No.: US 8,950,550 B2

(45) Date of Patent: Feb. 10, 2015

(54) ASCENDER AND DESCENDER APPLIANCE FOR CLIMBING AND DESCENDING ON A ROPE

(75) Inventors: Alain Maurice, Saint Hilaire du Touvet (FR); Benoît Vuillermoz, Saint-Martin-d'Hères (FR)

(73) Assignee: Zedel, Crolles (FR)

( * ) Notice: Subject to any disclaimer, the term of this patent is extended or adjusted under 35 U.S.C. 154(b) by 518 days.

(21) Appl. No.: 13/164,248

(22) Filed: Jun. 20, 2011

(65) Prior Publication Data

US 2011/0315480 A1 Dec. 29, 2011

(30) Foreign Application Priority Data

Jun. 23, 2010 (FR) ..................................... 10 02636

(51) Int. Cl.

*A62B 1/20* (2006.01)
*F16G 11/00* (2006.01)
*A62B 1/14* (2006.01)

(52) U.S. Cl.

CPC ........................................ *A62B 1/14* (2013.01)
USPC ........................ 182/193; 24/115 R; 24/115 A

(58) Field of Classification Search

USPC ............ 182/72, 193; 24/115 R, 115 A, 132 R
See application file for complete search history.

(56) References Cited

U.S. PATENT DOCUMENTS

| | | | | |
|---|---|---|---|---|
| 285,603 | A * | 9/1883 | fell | 188/65.3 |
| 723,868 | A * | 3/1903 | herbert | 182/193 |
| 1,159,616 | A * | 11/1915 | swisher | 24/115 R |
| 4,226,305 | A * | 10/1980 | Frestad | 188/65.2 |
| 4,311,218 | A * | 1/1982 | Steffen | 188/65.4 |
| 4,413,382 | A * | 11/1983 | Siegmann | 24/132 R |
| 4,450,603 | A * | 5/1984 | Hirsch | 24/132 R |
| 4,567,962 | A * | 2/1986 | Kladitis | 182/5 |
| 5,145,036 | A * | 9/1992 | Omalia | 188/65.5 |
| 5,544,723 | A * | 8/1996 | Gettemy | 188/65.4 |
| 6,131,697 | A * | 10/2000 | Bassett | 182/5 |
| 6,382,355 | B1 | 5/2002 | Kowalewski | |
| 8,167,086 | B1 * | 5/2012 | Brendley et al. | 182/5 |
| 8,235,172 | B2 * | 8/2012 | Thompson | 182/5 |
| 2005/0262669 | A1 * | 12/2005 | Thompson | 24/134 R |
| 2006/0081418 | A1 * | 4/2006 | Thompson | 182/193 |
| 2007/0215411 | A1 * | 9/2007 | Petzl et al. | 182/193 |
| 2009/0120720 | A1 * | 5/2009 | Arms | 182/193 |
| 2011/0315480 | A1 * | 12/2011 | Maurice et al. | 182/193 |
| 2014/0041960 | A1 * | 2/2014 | Jones et al. | 182/5 |
| 2014/0174850 | A1 * | 6/2014 | Paglioli | 182/5 |

FOREIGN PATENT DOCUMENTS

EP 0 220 070 A1 4/1987

* cited by examiner

*Primary Examiner* — Katherine Mitchell
*Assistant Examiner* — Candace L Bradford
(74) *Attorney, Agent, or Firm* — Oliff PLC

(57) ABSTRACT

An ascender/descender appliance for ascending and descending on a rope, comprising a body having attachment means to be connected to the user's harness and a clamping device able to be released on load. The clamping device is arranged outside the body and comprises a chain of metal links constituted by a succession of friction elements articulated on one another by connecting rods to form a series of gaps for the rope to pass in zigzag manner. Means are associated with the top link to trigger clamping of the ascender device.

11 Claims, 8 Drawing Sheets

ASCENDER AND DESCENDER APPLIANCE FOR CLIMBING AND DESCENDING ON A ROPE

BACKGROUND OF THE INVENTION

The invention relates to an ascender/descender appliance for climbing and descending on a rope, comprising a body having attachment means designed to be connected to the user's harness, and a clamping device able to be released on load.

Such a safety appliance is used by tree surgeons for lopping work, or for all types of working at heights.

State of the Art

The pulley and Prusik knot technique is often used by tree surgeons for climbing and descending on a rope. The Prusik knot is formed by means of a cord wound around the main rope. Descent is obtained by placing the hand on the top of the Prusik knot. The downwards action of the hand enables the speed of descent to be controlled. If the hand is removed, the knot retightens. Premature wear of the cord has however been observed, requiring frequent replacement of the Prusik knot to ensure safety. Another drawback is that of humidity of the rope and of the cord in case of rain, which can modify the force required to release the Prusik knot.

The document US 2006/0081418 (Thompson) describes an ascender/descender appliance having a series of clamping elements designed to perform a clamping effect of the rope. The clamping elements are all articulated on the same side of the device. To release the latter, two tongues located at the ends of the system have to be moved towards one another, either by hand or by means of the rope. By hand, the force required for releasing is high on load. By passing the rope around the two tongues, the releasing force can be reduced, but to stop on the other hand, the user does not control the stopping position with any precision.

The document U.S. Pat. No. 6,382,355 (Kowalewski) concerns an ascender/descender appliance for climbing and descending on a rope in which clamping is achieved by pinching of the rope created by a pivoting movement of a cam which presses the rope against the body of the device. Releasing is achieved by means of a knotted rope or an auxiliary lever so as to make the body of the appliance swivel to release the rope. Premature wear of the aluminum cam has however been observed, as has a lack of progressivity in descent, as well as the difficulty of fitting the rope, which requires the spindle and cam to be dismantled beforehand. The appliance can only be used with a double rope with a rope counter-pulley.

OBJECT OF THE INVENTION

The object of the invention consists in producing a self-locking ascender/descender appliance that is easy to handle when climbing and descending, and that is able to be released on load with a moderate force regardless of the degree of humidity of the rope.

The appliance according to the invention is characterized in that the clamping device is arranged outside the body and comprises a chain of metal links formed by a succession of friction elements articulated on one another by connecting rods to form a series of gaps for zigzag passage of the rope.

The top link of the chain collaborates with means for triggering blocking of the ascender device. Blocking is thus triggered from the top link and is then transmitted downwards with formation of a multitude of frictions which are amplified down to the bottom link articulated on the body. The user thereby remains immobilized on the rope due to the self-locking effect of the appliance. Releasing can be performed on load by manual action on the top link. If the pressing action on the top link is released, the ascender device automatically becomes active again due to the weight of the user.

The means for triggering blocking can be formed:

- either by a spring designed to separate the connecting rods at the top of the chain urging the top friction element into contact against the rope,
- or by a rider framing the top friction element and presenting a U-shaped structure rubbing against the rope,
- or by a pair of tongues articulated on the respectively spindles of the top link and of the penultimate link, each tongue having an opening for passage of the rope.

The friction elements of the chain of links comprise diabolos parallel to one another and extending perpendicularly to the body. Two successive diabolos are thus positioned on one and the other side of the rope.

BRIEF DESCRIPTION OF THE DRAWINGS

Other advantages and features will become more clearly apparent from the following description of an embodiment of the invention given for non-restrictive example purposes only and represented in the appended drawings, in which.

DETAILED DESCRIPTION OF THE INVENTION

Figure 1:
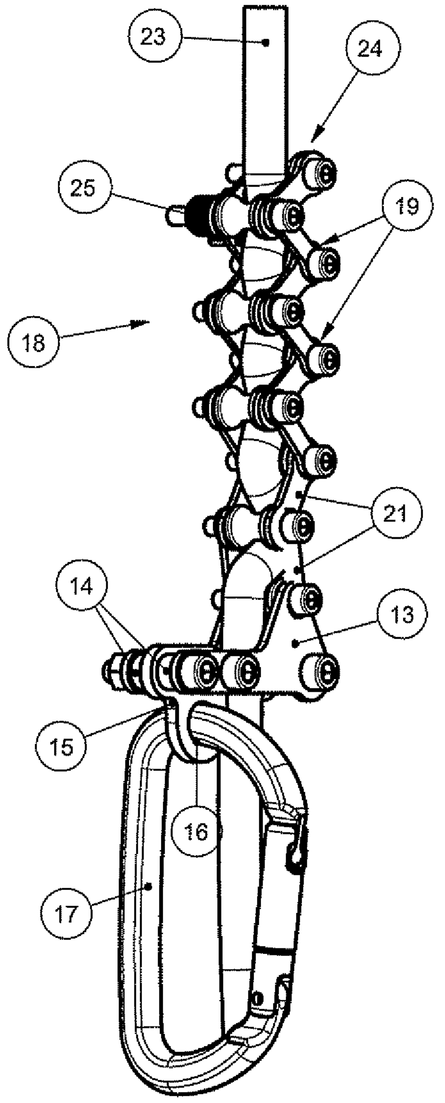
FIG. 1 is a schematic perspective view of an ascender/descender appliance according to the invention in single-rope use.
Figure 2:
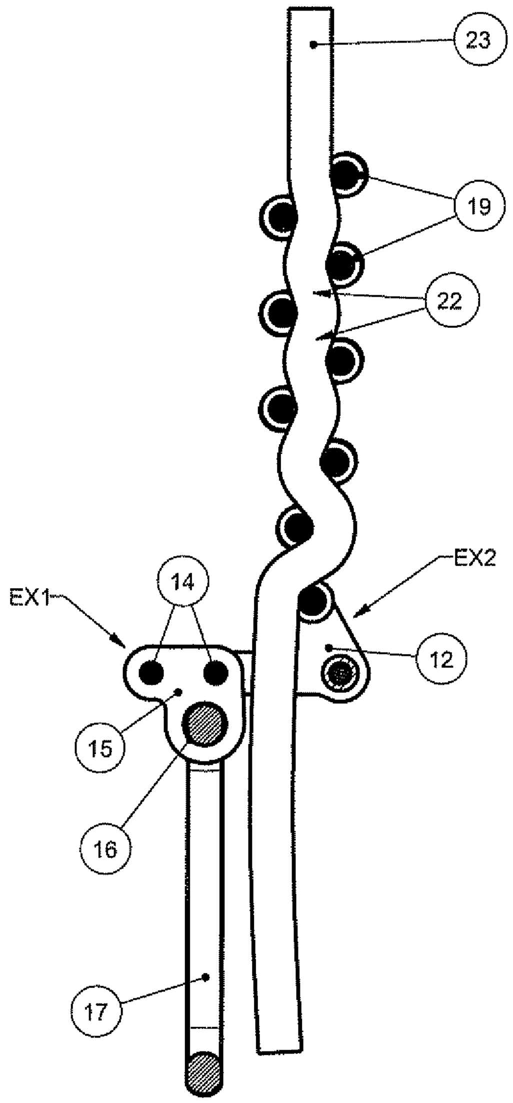
FIG. 2 shows a vertical cross-sectional view of the appliance of FIG. 1.
Figure 3:
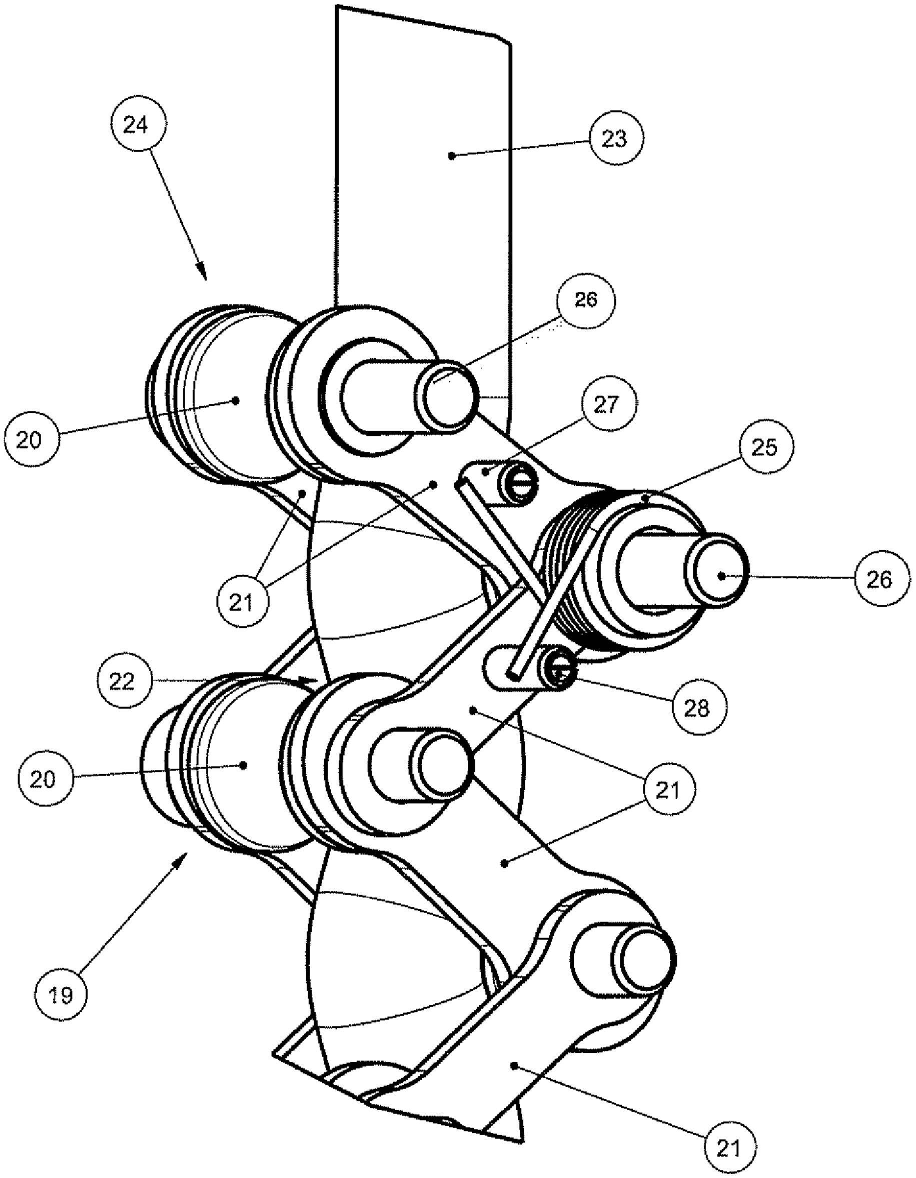
FIG. 3 represents a detailed view on an enlarged scale of the top part of the chain of links.

In FIGS. 1 to 3, an ascender/descender appliance 10 for ascending and descending on a rope comprises a metal body 11 formed by two parallel flange-plates 12, 13 separated from one another by spacers 14. One of the ends EX1 of body 11 is provided with an attachment lug 15 having a first opening 16 for attaching a first karabiner 17 designed to be connected to the user's harness (not shown).

The other end EX2 of body 11 is equipped with a chain of metal links 18 formed by a succession of friction elements 19 articulated on one another. This chain of links 18 is arranged outside body 11.

Friction elements 19 have identical structures in the form of diabolos 20 articulated on one another by connecting rods 21. Diabolos 20 are parallel to one another and extend in perpendicular directions to flange-plates 12, 13 so as to form a series of gaps 22 for rope 23 to pass through.

Rope 23 is fitted in zigzag manner in the successive gaps 22 of chain of links 18 and comes into contact with each of the diabolos 20. Two successive diabolos are thus positioned on the opposite sides of rope 23. In the presence of rope 23, this chain of links 18 constitutes the ascender device of the appliance.

Zigzagging of rope 23 in gaps 22 of chain of links 18 creates a plurality of frictions of the rope on diabolos 20. Top link 24 at the free end of chain 18 is advantageously provided with means for triggering clamping by friction of its diabolo 20 on rope 23.

This triggering can take place in different ways.

In, the example of FIG. 3, the triggering means comprise a spring 25, in particular a torsion spring, urging two pairs of connecting rods 21 away from one another making top diabolo 20 come into contact with rope 23. Torsion spring 25 is threaded on pivot-pin 26 of top link 24. The two opposite ends of spring 25 press on stops 27, 28 provided on one side on the last and penultimate rods 21.

Figure 7:
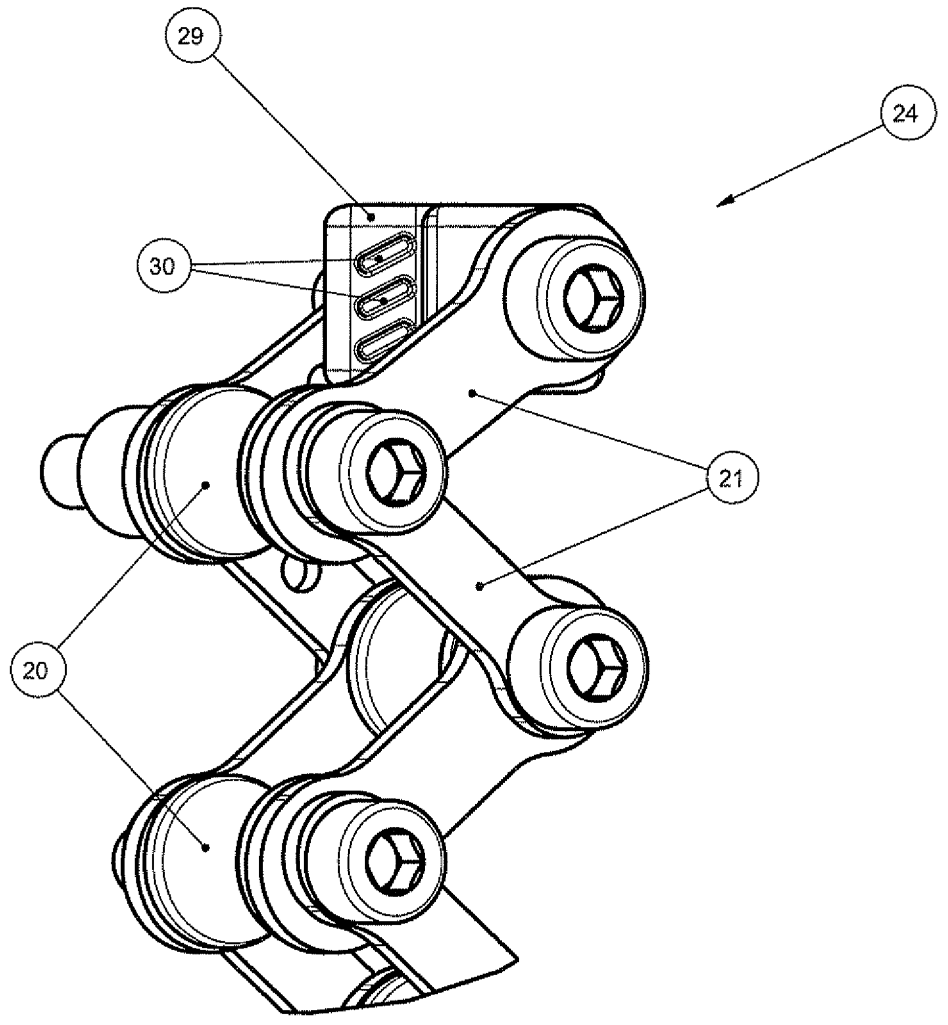
FIG. 7 is an alternative embodiment of FIG. 3.
Figure 8:
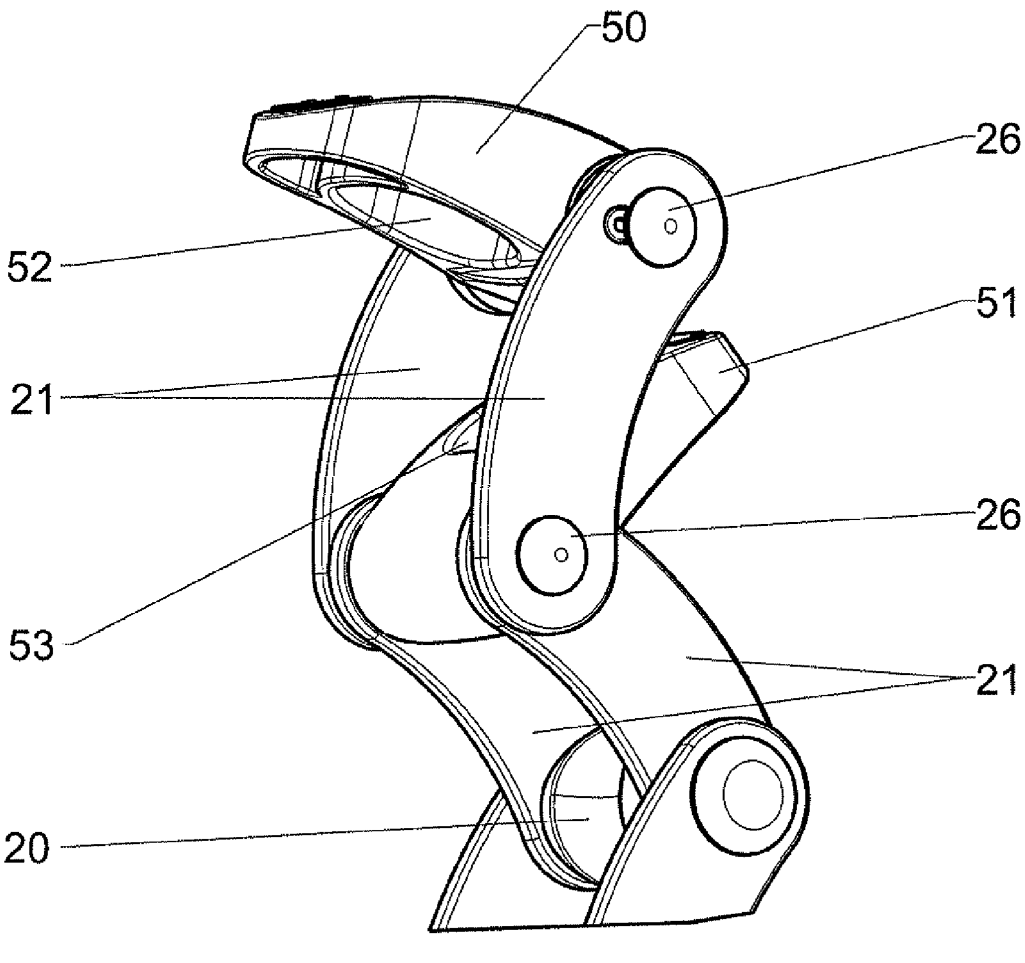
FIG. 8 is another alternative embodiment of FIG. 3.
Figure 9:
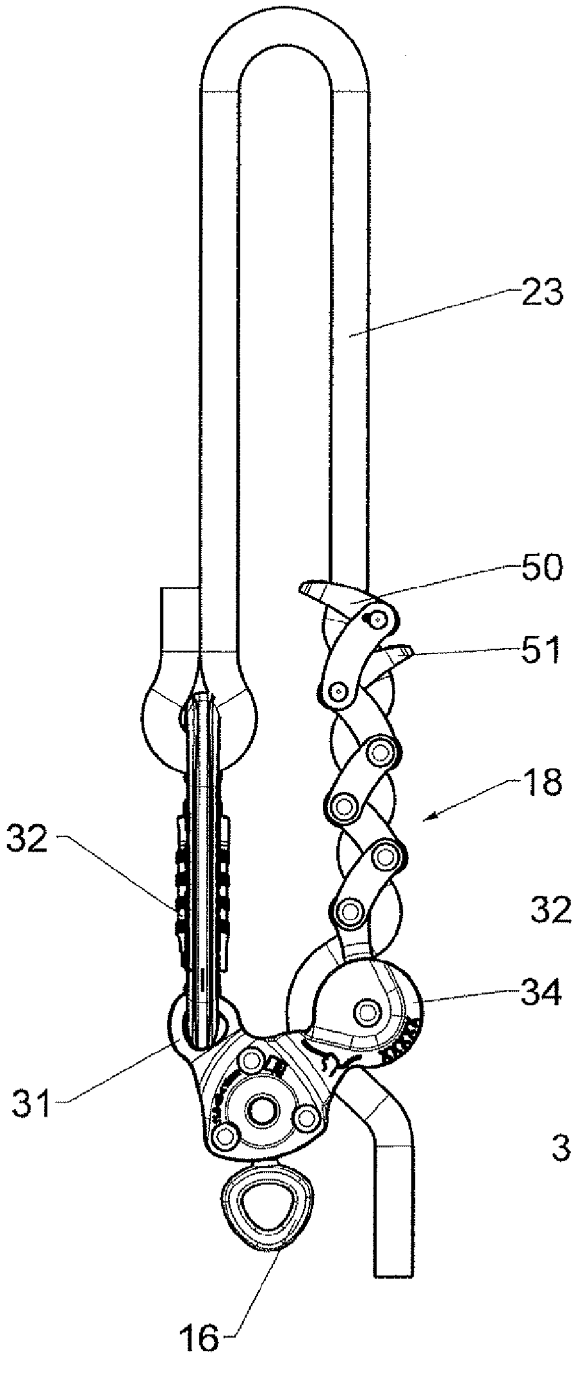
FIGS. 9 and 10 illustrate side views in cross-section of the appliance equipped with the device of FIG. 8 and represented in the clamped position.
Figure 10:
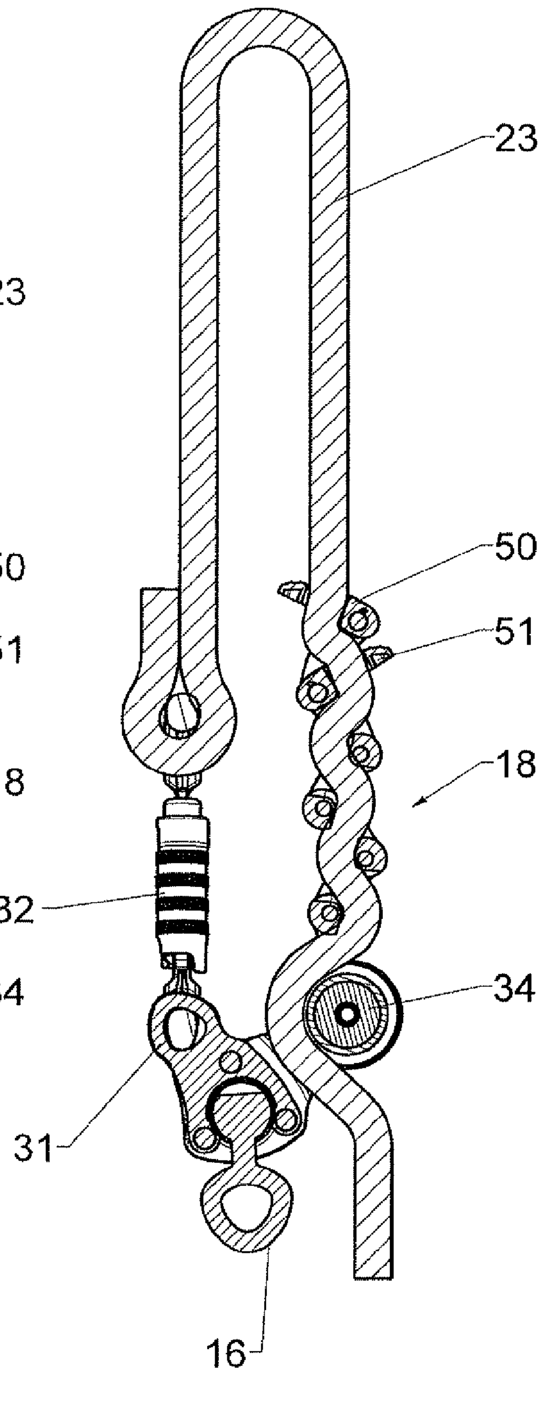
Figure 11:
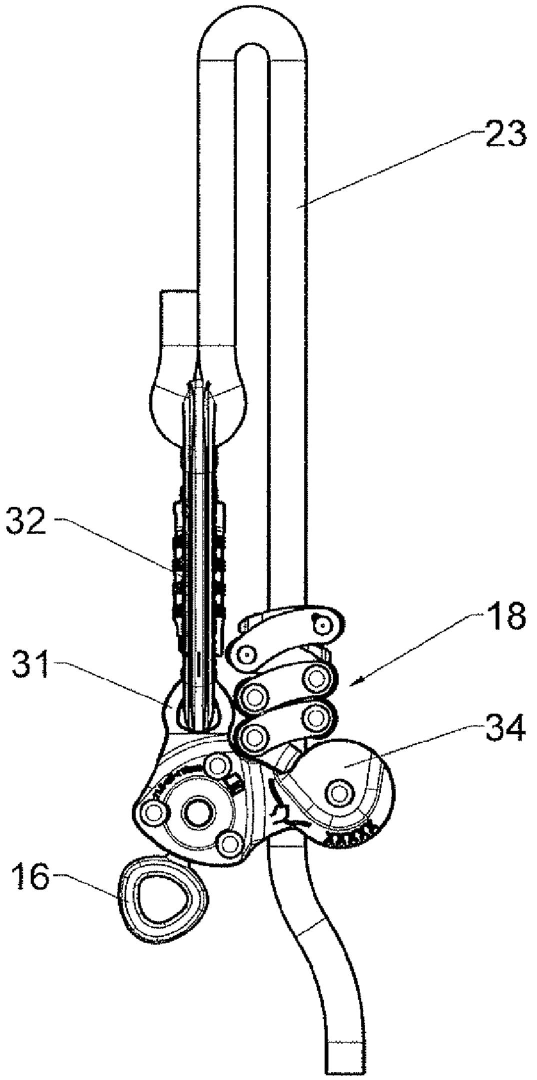
FIGS. 11 and 12 illustrate side views in cross-section of the appliance equipped with the device of FIG. 8 and represented in the released position.
Figure 12:
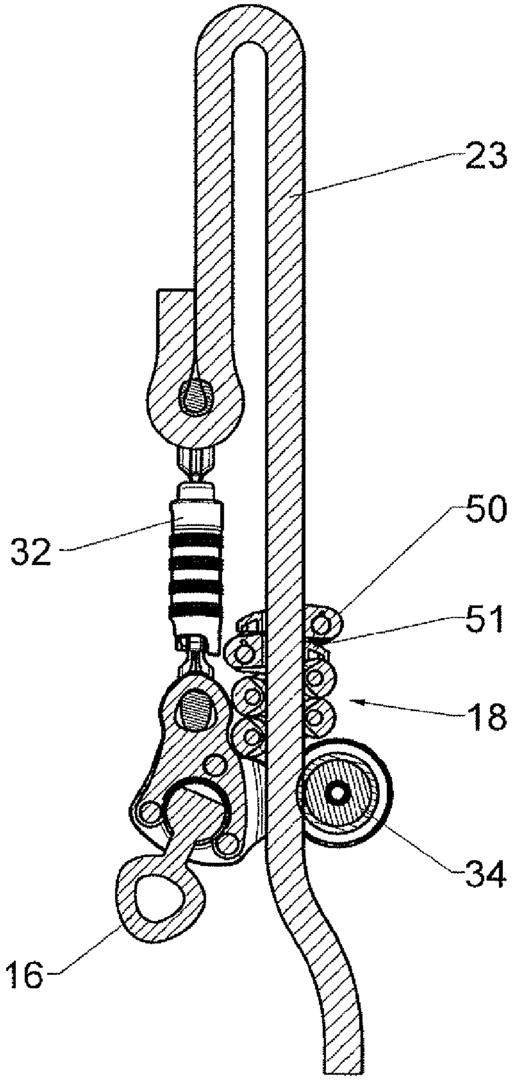

In the example of FIG. 7, friction of rope 23 on top link 24 is generated by a U-shaped rider 29 framing top diabolo 20 so as to rub against the rope. The inner surfaces of rider 29 comprise for example ribs 30, or can be made from or coated with a suitable material, in particular gum- or rubber-based. A combination of a spring and a rider can also be provided for triggering clamping.

Figure 4:
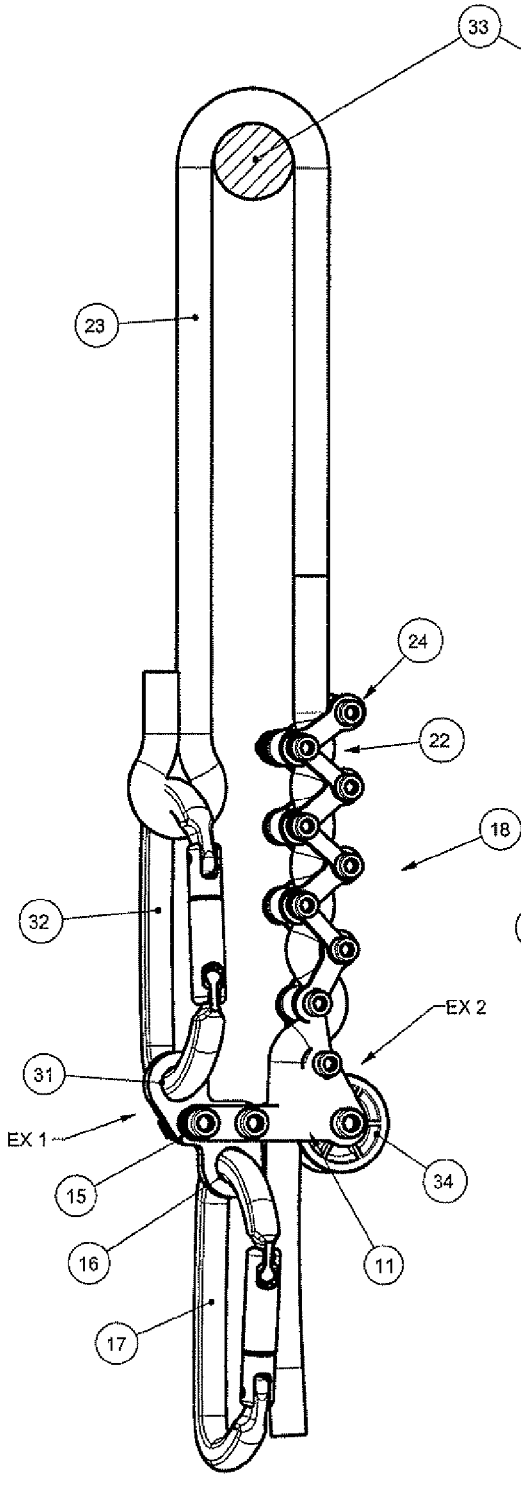
FIGS. 4 and 5 illustrate perspective views of an alternative embodiment of the appliance in double-rope use, respectively in the clamped and released position.
Figure 5:
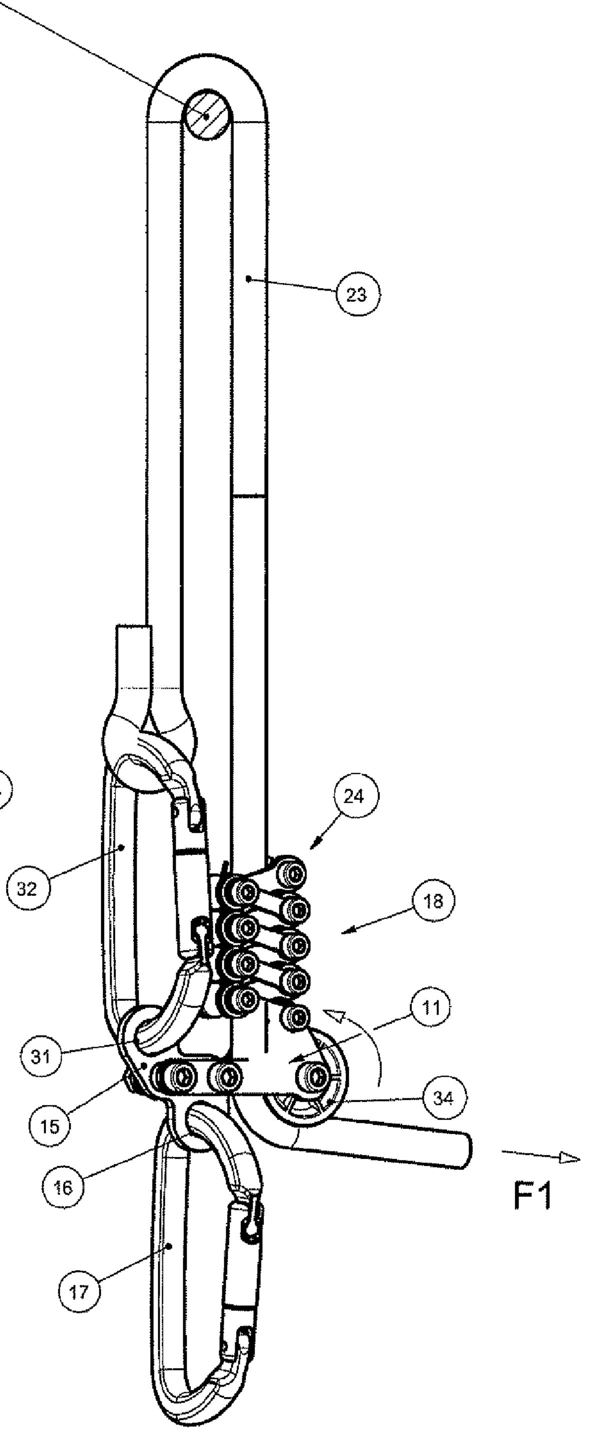
Figure 6:
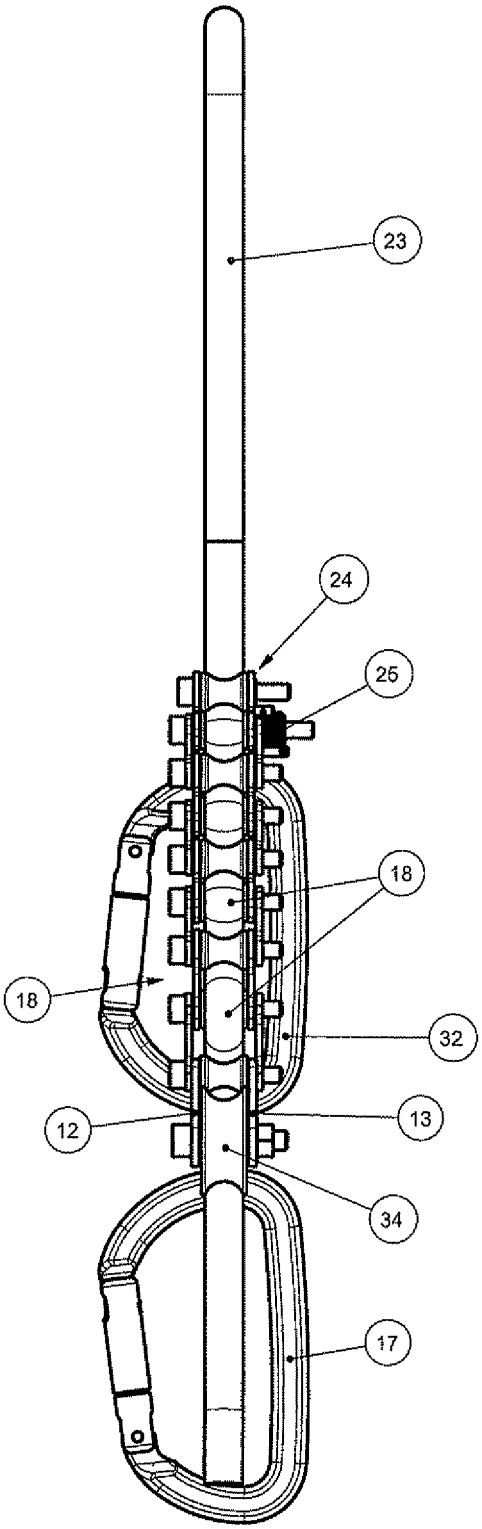
FIG. 6 is a side view of FIG. 4.

In FIGS. 4 to 6, attachment lug 15 comprises a second opening 31 for attaching the end of the rope by means of a second karabiner 32. This double rope use enables rope 23 to be passed around a counter-pulley 33 situated above appliance 10. This counter-pulley 33 can be formed by a branch of a shaft or by a ring or a wheel. Rope 23 is thus wound into a reverse U-shape and is attached to attachment lug 15 of appliance 10. Rope 23 passes through chain of links 18 and through the space comprised between flange-plates 12, 13 of body 11. A pulley 34 is fitted rotating freely between flange-plates 12, 13 at end EX2 of body 11 to favor upward hoisting.

Operation of the ascender/descender appliance 10 according to FIGS. 4 to 6 is as follows:

Clamping of appliance 10 is triggered on top link 24 by friction of its diabolo 20 on rope 23 following the action of spring 25. To perform clamping of appliance 10, the user applies his weight towards the bottom of body 11. Top link 24 being fixed, all the links of the other friction elements 19 swivel around pivot-pins 26 of their respective diabolos 20 with separation of their connecting rods 21. This results in lengthening of chain of links 18 (FIGS. 4 and 6) along rope 23 and a multitude of frictions that are amplified in the downwards direction down to the bottom link articulated on body 11. The user thus remains immobilized on rope 23 due to the self-locking effect of appliance 10.

Releasing can be performed on load by simply pressing on top link 24 to achieve release of the ascender. It is then possible to descend along rope 23 with a controlled and progressive speed. This releasing continues so long as the manual pressing action on top link 24 is maintained. If the pressing action on top link 24 is released, the ascender becomes active again, reclamping automatically due to the weight of the user.

To ascend in the direction of counter-pulley 33, the ascender has to be released and the user simply has to pull on the free bottom strand of rope 23 in the direction of arrow F1 (FIG. 5). The presence of pulley 34 facilitates this ascending movement, or upward hoisting movement.

With reference to the alternative embodiment illustrated in FIGS. 8 to 13, the same reference numbers will be used to designate identical or similar parts. The means for triggering clamping at the top part of chain of links 18 comprise a first tongue 50 articulated on pivot-pin 26 of top link, and a second tongue 51 articulated on pivot-pin 26 of the penultimate link. Both of tongues 50, 51 comprise an opening 52, 53 for rope 23 to pass in zigzag fashion. Such an association of two tongues 50, 51 makes it possible to pull chain of links 18 firmly upwards (FIGS. 9 to 11) and adapts better to different rope diameters. Releasing is performed as in the embodiment of FIGS. 4 and 5 by pressing on top first tongue 50, thereby triggering the ascender.

The invention claimed is:

1. An ascender and descender appliance for ascending and descending on a rope, comprising:

a body having an attachment device that connects to a user's harness, a clamping device, the clamping device being arranged outside the body and comprising a chain of metal links formed by a succession of friction elements, wherein the friction elements comprise a plurality of diabolos, each of the plurality of diabolos being connected to one another at each end by a pair of connecting rods so as to form a series of gaps for zigzag passage of the rope, each adjacent diabolo of the plurality of diabolos is positioned on the opposite sides of the rope, and the chain of metal links comprises a top part that collaborates with a triggering device that releases the clamping device, so long as a manual pressing action is maintained on the top part, said clamping device becoming automatically active for reclamping the rope due to the weight of the user, when the manual pressing action is released.

2. The ascender and descender appliance according to claim 1, wherein the triggering device comprises a spring designed to separate the connecting rods at the top of the chain, so as to urge an uppermost diabolo of the plurality of diabolos into contact against the rope.

3. The ascender and descender appliance according to claim 2, wherein the spring is a torsion spring threaded onto a pivot-pin inserted in a top link of the chain of metal links, and the opposite ends of the spring press against stops provided on a last connecting rod and a penultimate connecting rod.

4. The ascender and descender appliance according to claim 1, wherein the triggering device comprises a rider that frames an uppermost diabolo of the plurality of diabolos, the rider having a U-shaped structure and being configured to rub against the rope.

5. The ascender and descender appliance according to claim 4, wherein the rider has inner surfaces that comprise ribs, and the inner surfaces of the rider are in contact with the rope.

6. The ascender and descender appliance according to claim 4, wherein the inner surfaces of the rider are coated by a gum- or rubber-based material.

7. The ascender and descender appliance according to claim 1, wherein the plurality of diabolos are parallel to one another and extend perpendicularly to the body.

8. The ascender and descender appliance according to claim 1, wherein, at one end of the body, the attachment device comprises a first opening for attaching a first karabiner connected to the harness, and a second opening for attaching a second karabiner connected to a top strand of the rope when a double rope is used.

9. The ascender and descender appliance according to claim 8, wherein the chain of metal links is arranged at another end of the body, which is formed by a pair of parallel flange-plates separated from one another by spacers.

10. The ascender and descender appliance according to claim 9, wherein a pulley is arranged between the flange-plates to facilitate a sliding movement of the rope during climbing or upward hoisting.

11. The ascender and descender appliance according to claim 1, wherein the triggering device comprises a pair of tongues located on respective pivot-pins of a top link and a penultimate link of a clamping device, each tongue having an opening for passage of the rope.

* * * * *